United States Patent [19]
Rebers et al.

[11] Patent Number: 5,247,135
[45] Date of Patent: Sep. 21, 1993

[54] AERIAL TERMINAL

[75] Inventors: Kenneth D. Rebers, Austin; Dean C. Krenz, Round Rock; Sergio A. Alarcon, Austin, all of Tex.

[73] Assignee: Minnestoa Mining and Manufacturing Company, St. Paul, Minn.

[21] Appl. No.: 832,428

[22] Filed: Feb. 7, 1992

[51] Int. Cl.[5] .......................................... H02G 15/113
[52] U.S. Cl. ........................................ 174/92; 174/41; 174/60; 174/93
[58] Field of Search ..................... 174/91, 92, 93, 41, 174/60

[56] References Cited

U.S. PATENT DOCUMENTS

| D. 278,623 | 4/1985 | Anderson | D13/24 |
|---|---|---|---|
| 3,836,696 | 9/1974 | Gressitt et al. | 174/41 |
| 4,390,744 | 6/1983 | Suffi et al. | 174/41 |
| 4,414,426 | 11/1983 | Burtelson | 174/59 |
| 4,513,171 | 4/1985 | Suffi et al. | 174/41 |
| 4,535,197 | 8/1985 | Butler | 174/41 |
| 4,536,611 | 8/1985 | Butler | 174/41 |
| 4,605,815 | 8/1986 | Wilson | 174/41 |
| 4,647,715 | 3/1987 | Butler | 174/41 |
| 4,694,118 | 9/1987 | Schmidt | 174/41 |
| 4,810,829 | 3/1989 | Rutenbeck | 174/41 |
| 4,812,942 | 3/1989 | Kupferschmidt et al. | 361/119 |
| 4,822,954 | 4/1989 | Rebers et al. | 174/93 |
| 4,908,482 | 3/1990 | Shimirak et al. | 174/93 |
| 4,992,627 | 2/1991 | Mullaney | 174/41 |
| 5,136,121 | 8/1992 | Kluska et al. | 174/93 |

FOREIGN PATENT DOCUMENTS

WO89/05534 6/1989 PCT Int'l Appl. .

Primary Examiner—Morris H. Nimmo
Attorney, Agent, or Firm—Gary L. Griswold; Walter N. Kirn; John C. Barnes

[57] ABSTRACT

An aerial terminal for telecommunication wires is preferably blow-molded, and includes a closure for the in-line splices to a cable and a housing for the drop wire connectors can be mounted together, with the housing mounted on the side of the splice closure so both the interior of the closure and the drop wire connectors are readily accessible from one side.

7 Claims, 5 Drawing Sheets

AERIAL TERMINAL

BACKGROUND OF THE INVENTION

1. Field of the Invention

The present invention relates to the cable drop wire terminal, in particular to a double-wall casing and terminal block housing. The invention particularly concerns a light weight, strong, unitary cable splice closure and aerial drop wire box as used in the electrical transmission and telecommunications industries.

2. Description of the Prior Art

There are a number of patents which illustrate aerial communication cable closures which have associated therewith a terminal box for connecting drop wires to selected wire pairs of the cable. Examples of these patents are U.S. Pat. Nos. 3,836,696; 4,390,744; 4,535,197; 4,536,611; 4,605,815; 4,647,715; and 4,694,118. Each of these closures have a closure and a drop wire box for connecting drop wires at the same location of a cable splice or where a cable is opened.

There are other drop wire boxes which are separate from the closure and are designed to hang from the closure or hang separately from the support strand. Examples of these are U.S. Pat. Nos. 4,414,426; 4,513,171; and 4,992,627.

Of the first group of patents, U.S. Pat. No. 3,836,696 discloses a single-piece molding of relatively rigid plastic material and it has a single door 26 mounted by an integral or living hinge 27. On this unit, opening the door exposes the terminal panel 30 which is a single piece I-beam shaped structure which is mounted in the housing 20. This structure has a lot of extra parts making it cumbersome to mount on the wire and heavy. U.S. Pat. No. 4,390,744 discloses an integral drop wire terminal and closure which comprises multiple structural pieces which are fitted on a support bracket 40 including clamp brackets 70 and 72 and mounting bar 42. A barrier wall 44 supports the terminal members and divides the cable conductor portion from the terminal compartment. As readily seen the closure is very complicated and includes a number of independent heavy support parts to hold the same on the support strand and on the cable. U.S. Pat No. 4,535,197, in FIGS. 8-11, illustrates a closure having a terminal area with a separate terminal lid. The invention is directed at a closure that is maintained secure and more impervious to rain water, ultra-violet light and insects. The patent says the closure 10 includes a hollow, flexible wall, tubular housing 18 with a pair of longitudinal mating edges 20 and 22 separated by longitudinal access slot. The embodiment of FIG. 8 includes a termination port 25 including a rectangular frame 24 formed about a rectangular opening in one side of the tubular housing 18 between ribs 30 and 30'. A rectangular lid hinged to the frame 24 closes the opening. U.S. Pat. No. 4,536,611 discloses a tubular frame similar to that of U.S. Pat. No. 4,535,197 but has a separate terminal block panel assembly 34 installed within a rectangular frame 24 with a separate lid 28. U.S. Pat. No. 4,605,815 discloses a two part 14a, 14b shell and the shells are held together by articulated bindings 30 and 31. The shell 14a has affixed to the exterior of its mid-portion a terminal block compartment 26 which is accessible through an upwardly pivotal door 28. This closure is designed to have separate areas such that unauthorized personnel cannot inadvertently disturb the wirework area but only leave the block compartment accessible through door 28. U.S. Pat. No. 4,647,715 discloses another closure by David O. Butler including a one-piece, hollow, box-like housing 16 with longitudinal interconnecting edges 22 and 24 which can be fastened to close the closure after the cable has passed through the slot. FIGS. 4-7 illustrate a separate terminal compartment 71 which is attached to one side of the housing 16 by bolts which extend through the housing. A terminal block is mounted within the compartment 71. A popular aerial closure is illustrated in U.S. Pat. No. 4,694,118, but this closure is a heavy structure formed of high impact plastic with a splicing housing and a terminal housing, affixed and disposed immediately below the splicing housing. The splicing housing has a hinged cover 36 and terminal housing has a cover 48. Each compartment has a top wall, back wall, opposite end walls and a bottom wall. This structure boarders on the separateness of the terminal block from the splice compartment, but they have openings through the congruent portions of the housing and block for the wires of the terminal block to pass.

The patents disclosing the separate termination housings do not have common areas or walls and are generally separately suspended from the support strand.

The prior art patents for combined closures and terminal blocks do not teach making such a structure by the blow molding process or how the blow molding can effectively be utilized to reduce the number of parts and provide the convenience of mounting and use afforded thereby. There is prior art concerning the blow molding of aerial closures and one patent is U.S. Pat. No. 4,810,829 which teaches the advantages of blow molding for closures to obtain a light strong closure. There is no teaching, however, of using the structure of this closure for a drop wire closure and combining the two to obtain the advantages and convenience that is available with the present invention.

SUMMARY OF THE INVENTION

The aerial terminal of the present invention is especially adapted for the telecommunications industry and is used to splice and terminate cables. The terminal comprises a splice casing and a terminal block housing. They are both blow-molded parts. The splice closure comprises a generally cylindrical casing having a first and a second casing half joined along a longitudinal hinge line and having a longitudinal mating opening seam. The casing halves each have a sidewall section of double-wall construction defining an inner-wall portion and an outer-wall portion, with at least one cavity therebetween and first and second end walls extending between the inner-wall portion and the outer-wall portion to close each cavity. The casing has attachment means for a hanger to permit the closure to be suspended from a support cable. The casing also has a wall portion defining a support area. The terminal block housing is formed with a bottom wall, a top wall, opposite end walls and a lid, each of which are formed with an outer-wall portion and an inner-wall portion with at least one closed cavity therebetween and a back wall. The back wall is formed to have at least a portion thereof correspond to said support area, at which the terminal block housing and the casing are joined. The terminal block housing has an array of drop wire blocks supported on the back wall for connection to wires extending into the casing and make in-line splices to wires in the cable and to connect to distribution wires or drop wires.

The terminal casing is formed of two halves, which are formed integrally and a hinge is formed at thin wall sections of the casing halves. The lid of the terminal block housing is formed integrally with the top wall of the terminal block housing.

The second terminal half and the lid, outer wall portions, are formed with a recess and a detent for retaining the lid in an open position and the lid and bottom wall have catch means for holding the lid in a closed position.

One end wall of the terminal block housing is formed with molded recesses in the inner wall to receive a cable slitting assembly for separating the wires of a cable prior to entering them in a terminal block. The bottom wall of the terminal block housing is formed with a plurality of openings to permit passage of a cable out of the housing.

DETAILED DESCRIPTION OF THE EMBODIMENT

A detailed description of the preferred embodiment is provided herein. It is to be understood, however, that the present invention may be embodied in various forms. Therefore, specific structural and functional details disclosed herein are not to be interpreted as limiting, but rather as a basis for the claims and as a representative basis for teaching one skilled in the art to employ the present invention in virtually any appropriately detailed system, structure or manner.

Figure 1:
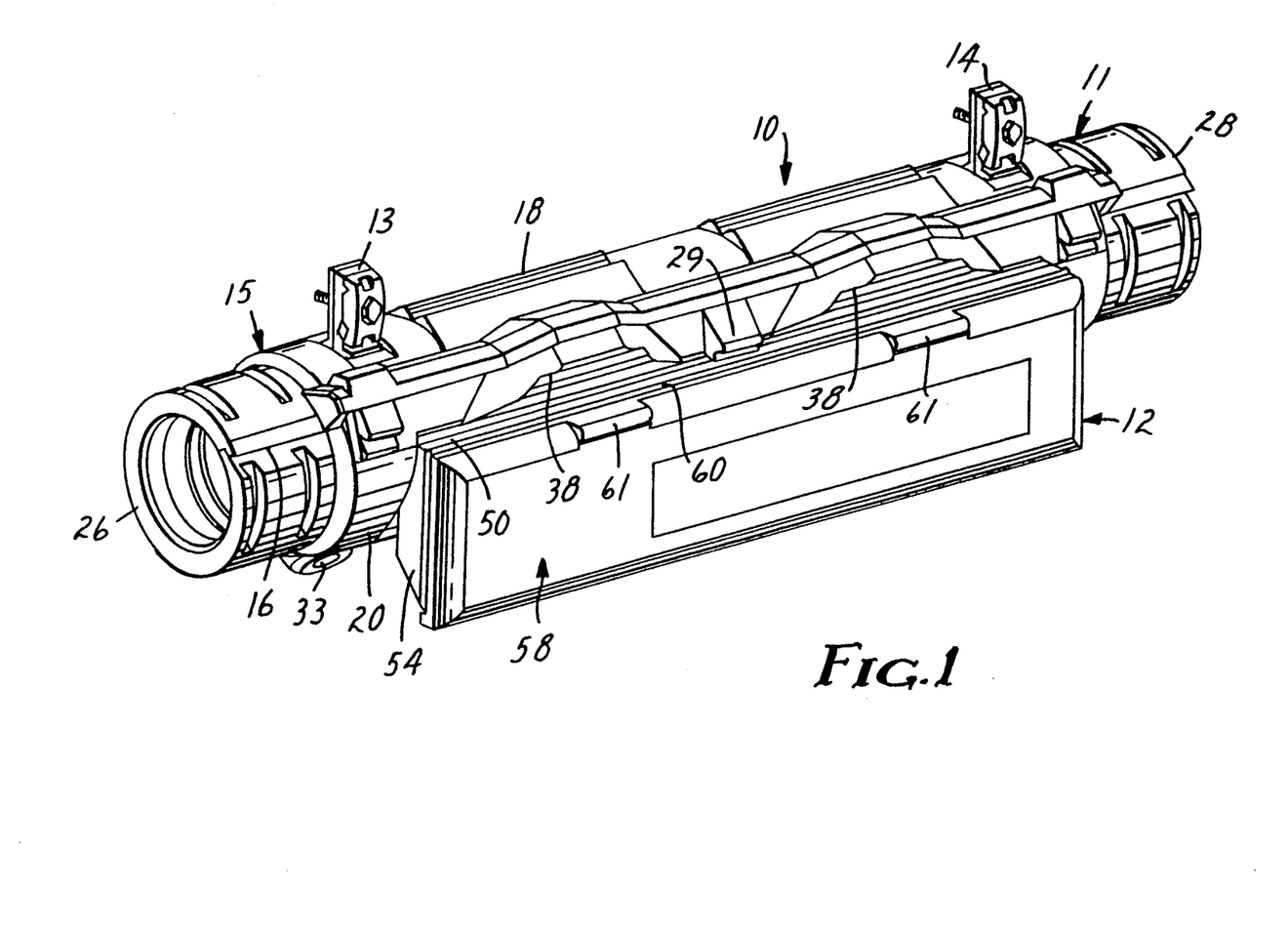
FIG. 1 is a perspective view of a terminal according to the present invention.

Referring to FIG. 1, the reference numeral 10 refers to the new aerial terminal, hereinafter referred to as the terminal 10, and it comprises an integral splice closure 11 and a terminal block housing 12. The terminal 10 is adapted to be suspended from a support cable by means of a pair of hangers 13 and 14.

Still referring to FIG. 1, splice closure 11 comprises a casing 15 openable along an edge or opening seam 16, formed with mating ridges and grooves to form a labyrinth-type seal for restricting the ingress of dirt, water, bugs, etc. to the casing 15. Generally, casing 15 comprises first and second sections 18 and 20, see also FIGS. 2, 4 and 6, hingedly connected to one another along a hinge line 22. For the preferred embodiment, hinge line 22 is defined by a compression molded hinge 24, see FIG. 2. That is, hinge 24 is integral with casing sections 18 and 20. Preferably casing 15 is molded from a durable plastic, such as a polyethylene or the like. In this manner, hinge 24 can be readily formed integrally with the casing sections 18 and 20, when molded. The casing 15 according to the present invention is blow molded, using blow molding techniques. Preferably each section 18 and 20 is about a one-half of the casing 15. That is, each of sections 18 and 20 is substantially semi-cylindrical in configuration.

Figure 2:
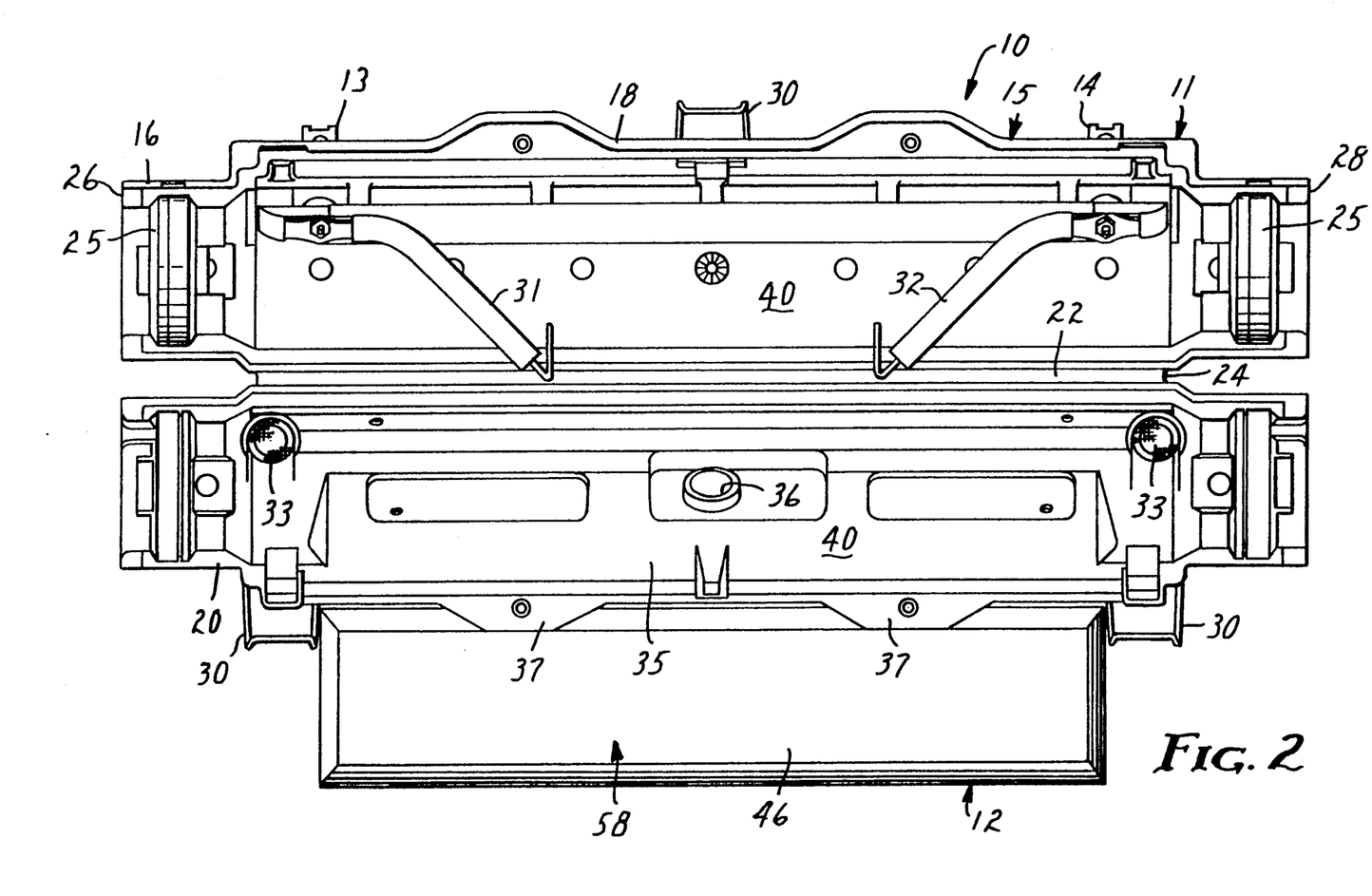
FIG. 2 is a side view of the terminal when the casing is opened and the lid is opened.
Figures 5, 6:
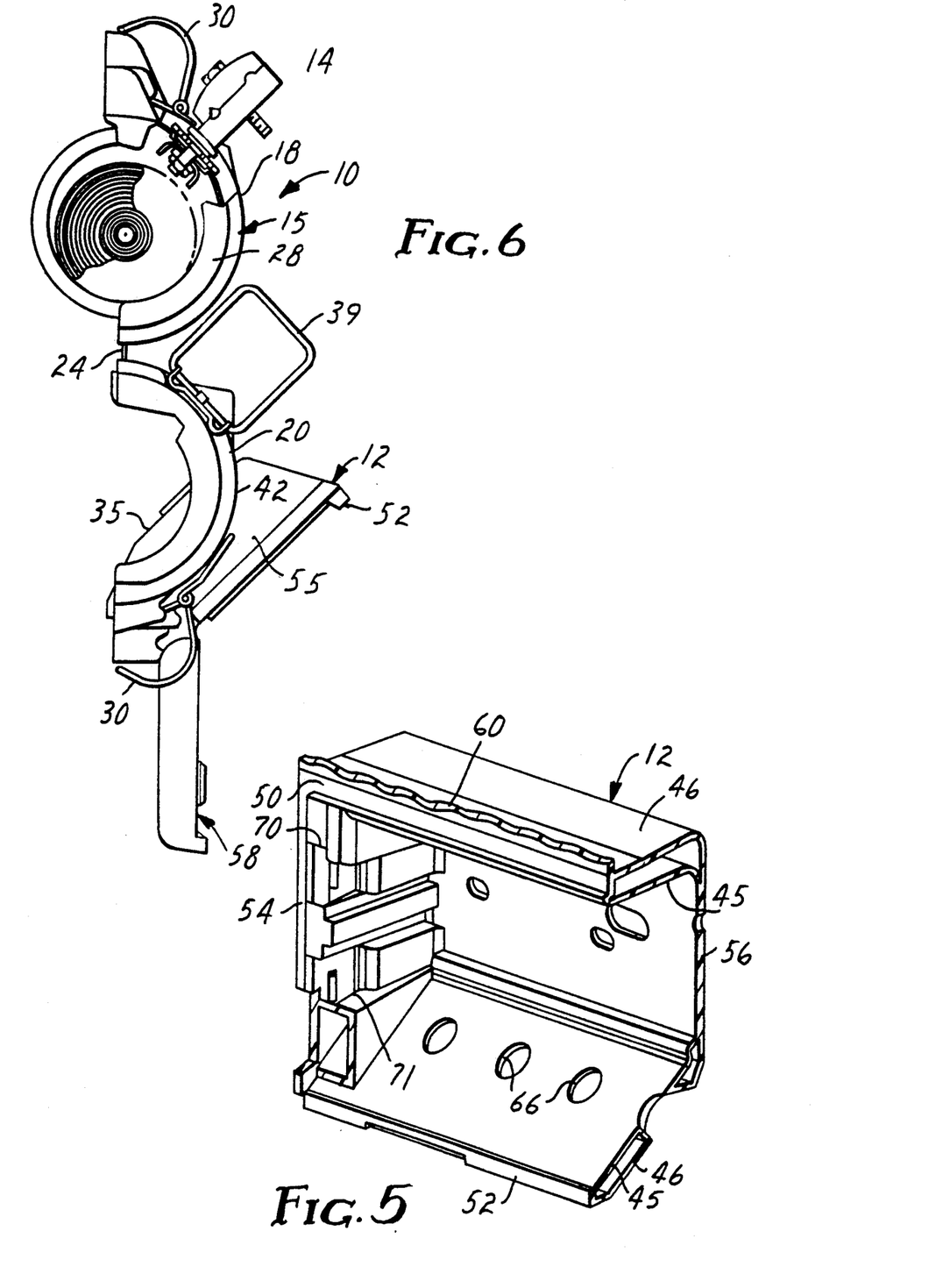
FIG. 5 is a detail sectional view of the terminal block housing.
FIG. 6 is an end view of the terminal showing the casing in an open position and the terminal block housing in the open position.

Referring again to FIG. 1, for the preferred embodiment casing 15 has an elongate, substantially cylindrical, shape with first and second opposite ends 26 and 28, in which are disposed end seals 25, see FIGS. 2 and 6, for receiving and sealing about cables entering the ends. The cylindrical casing 15 is selectively maintained secured in a closed condition, by latch means or fastening arrangements 30. The fastening arrangements 30 may be any of a variety of conventional arrangements whereby section 18 can be selectively maintained secured to section 20, along seam 16. For the embodiments shown, each latch arrangement 30 includes an actuator handle and a securing latch forming a toggle latch, see FIG. 6. Thus the casing 15 can be readily closed, and opened, as desired, to provide access to an interior of the casing 15.

Figure 4:
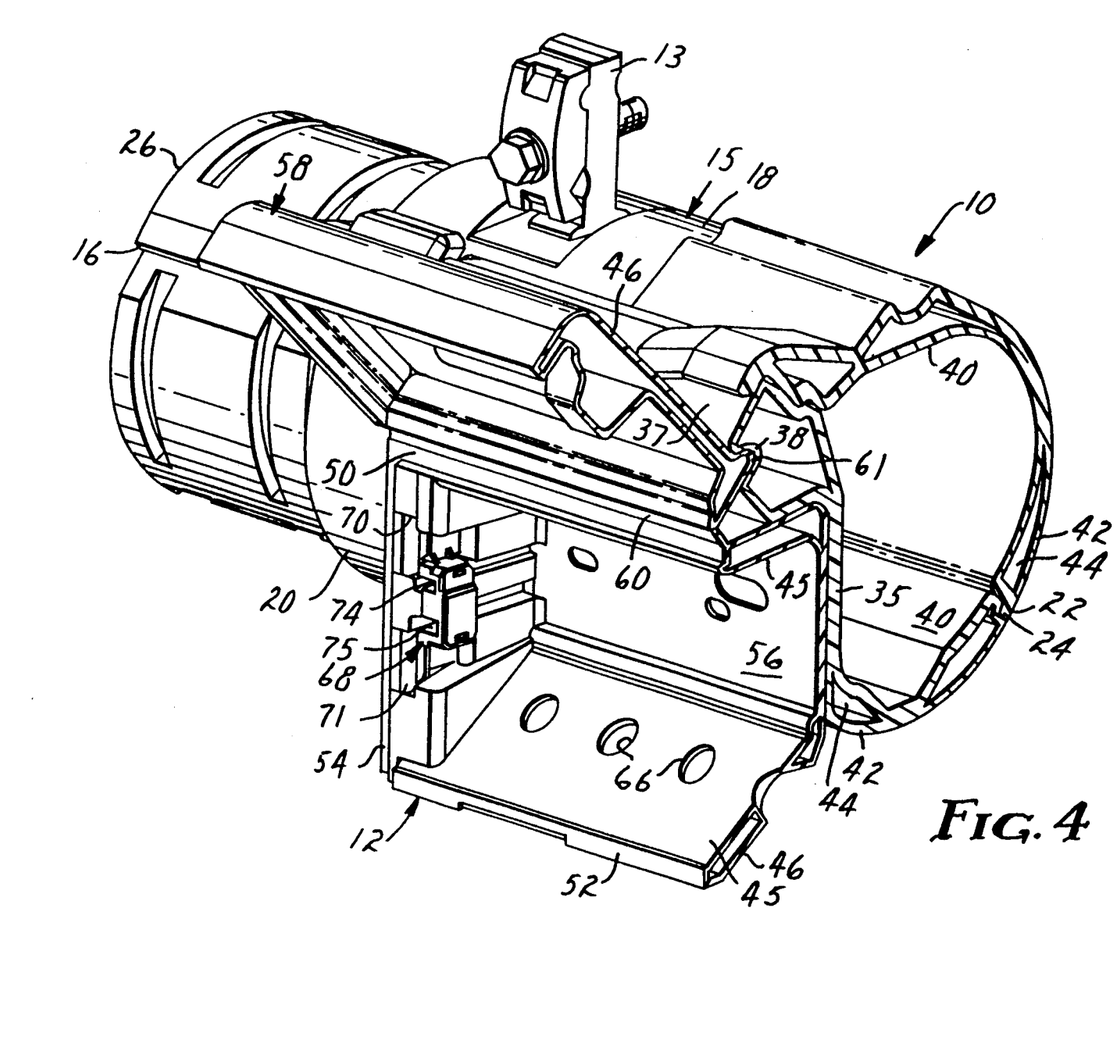
FIG. 4 is a perspective cross sectional view of the casing and terminal block housing as shown in FIG. 3, with the connectors deleted.

First, as will be apparent by examination of FIGS. 1 and 4, ease of access to an enclosed splice area within the casing 15 is facilitated by the rotational position of (upper) casing half 18 of the casing 15, relative to the lower half 20. In particular, preferably section 20 is rotationally oriented with respect to section 18 such that when (bottom) section 20 is opened, a substantially unobstructed view is provided to the splice area inside the casing. This is accomplished by preferred positioning of the hinge line 22, rotationally, relative to the attachment area for the closure 11, or the hanger means, i.e. the hangers 13 and 14. Specifically, the hinge line 22 is rotationally positioned between about 125 degrees to 145 degrees, and preferably about 135 degrees, from attachment points of the hangers 13 and 14 for mounting the terminal to a support cable.

In FIGS. 2 and 6, the casing 15 itself is depicted in the opened position along the hinge line 22. In FIG. 2 the viewer's perspective is looking into the casing as if were laying on a table to illustrate the inside of the casing 15. The section 18 is a continuous casing half with areas for receiving the hangers 13 and 14 and interiorly the hangers are fastened by securing bolts which are also connected to grounding straps 31 and 32 which are provided to connect to the shield or ground wires of the cables. The end seals 25, which may be formed according to U.S. Pat. No. 4,857,672, assigned to the assignee of this application, are supported in the ends 26 and 28 of this section 18 by axially projecting bars formed to be received in recesses in the ends of section 18 such that the end seals 25, upon receiving a cable therethrough, will be retained there. The end seals 25 are engaged and finally sealed by the cooperating recessed areas at the ends of the section 20 when section 20 is rotated about the hinge to the closed position.

Section 20 of the casing 15 comprises openings 33, which are screen covered, to form drains in the lower portion of the casing 15. The casing 15 also includes a support surface 35. The support surface 35 is generally rectangular and flat, inside and outside the casing section. The surface 35 is formed with a plurality of openings 36 through which wires may pass to connect the wires from a plurality of terminal blocks to the wires of the cables by in-line splices to wires of the cable passing through the closure. These splices are sometimes referred to as "half taps" but are a taping in of a pair of wires from a terminal block to a pair of wires of the cable. Of significance is the fact the surface 35 is positioned to be located on a side of the casing 15 below the opening seam such that the terminal block housing 12 supported thereon is readily accessible from the side or front of the mounted terminal 10. The closure 11 further includes the fastening arrangements 30, and a pair of the fastening arrangements 30 are supported on the section 20 of the casing and the middle or third arrangement 30 is supported in the middle portion of casing section 18 to permit the securing latch to engage a boss 29 on section 20 above the support area. Further, section 20 supports on its outer surface a plurality of drop wire strain relief brackets 39 of the closure 11, see FIG. 6, which brackets support the drop wires entering the terminal block housing 12. Adjacent to the opening seam 16, in the outer wall 42 of the casing section, as will be described herein, are a pair of projections 37 with concave portions defining recesses 38 formed for receiving the lid of the terminal block housing 12 when it is desired to access the interior of the housing as will be described.

As will be understood from the cross-sections illustrated in FIGS. 4 and 5, many sidewall portions of the casing sections 18 and 20, and the terminal block housing 12 have a double-wall structure. That is, the casing sections 18 and 20 have an inner wall 40 and an outer wall 42, closed by end walls at the ends 26 and 28, with one or more cavities or insulating space(s) 44 therebetween. The terminal block housing 12 has interior walls 45 and exterior walls 46 defining therebetween a plurality of cavities also. It is noted that the double wall also provides for significant strength and impact protection for the casing and terminal box. The inner walls 40 and 45, occasionally have recessed holes formed in the location of ejection pins, which cause the walls to join and strengthen the structures.

It will be readily understood, by examination of all figures, that not all portions of the casing 15 and the terminal box 12 have the spaced double-wall construction, however substantial portions do. Referring specifically to FIG. 4, the cross section of the casing 15 and the terminal box 12 is illustrated and the support area 35, of the casing section 20 and at least a portion of the back wall 56 of the terminal box 12 are formed of increased thickness where the parisons forming the casing and the box 12 were pressed together to form a single wall of increased thickness.

Terminal block housing 12 is joined to the casing 15 at the support area 35 by suitable fastening means to make the terminal a unitary structure, such fastening means including pop rivets, machine screws or bolts. The support area 35 is positioned to place the terminal housing on the side of the casing when the terminal 10 is suspended from a support cable. The terminal housing 12 comprises a top wall 50, of double wall construction, a bottom wall 52, of double wall construction, end walls 54 and 55 of double wall construction, a back wall 56, of single wall construction as described above, and a lid 58, of double wall construction. The lid 58 is hinged to the top wall 50 of the housing and is preferably defined by a compression molded hinge 60, see FIG. 4. That is, hinge 60 is integral with top wall 50 of the housing 12 and the lid 58. The housing 12 is molded from a durable plastic, such as a polyethylene or the like. In this manner, hinge 60 can be readily formed integrally with the walls of the housing 12, when molded. The housing 12 is blow molded, like the casing 15, using blow molding techniques. The lid 58 is formed on its outer wall 46 adjacent to the hinge with detents 61, which detents cooperate with the recesses 38 to maintain the lid 58 in a raised position when raised sufficiently by a service technician wanting to work on the terminal connectors inside the box 12. The flexibility of the outer wall 42 forming the projections 37 is sufficient to permit the detents 61 to enter the recesses 38, and the flexible hinge 60, flexes slightly to allow the lid detents to enter the recesses to secure the lid in the raised open position. The lid 58 and the lower wall 52 have catch means to form interference fit closure fasteners to hold the lid in the closed position.

Figure 3:
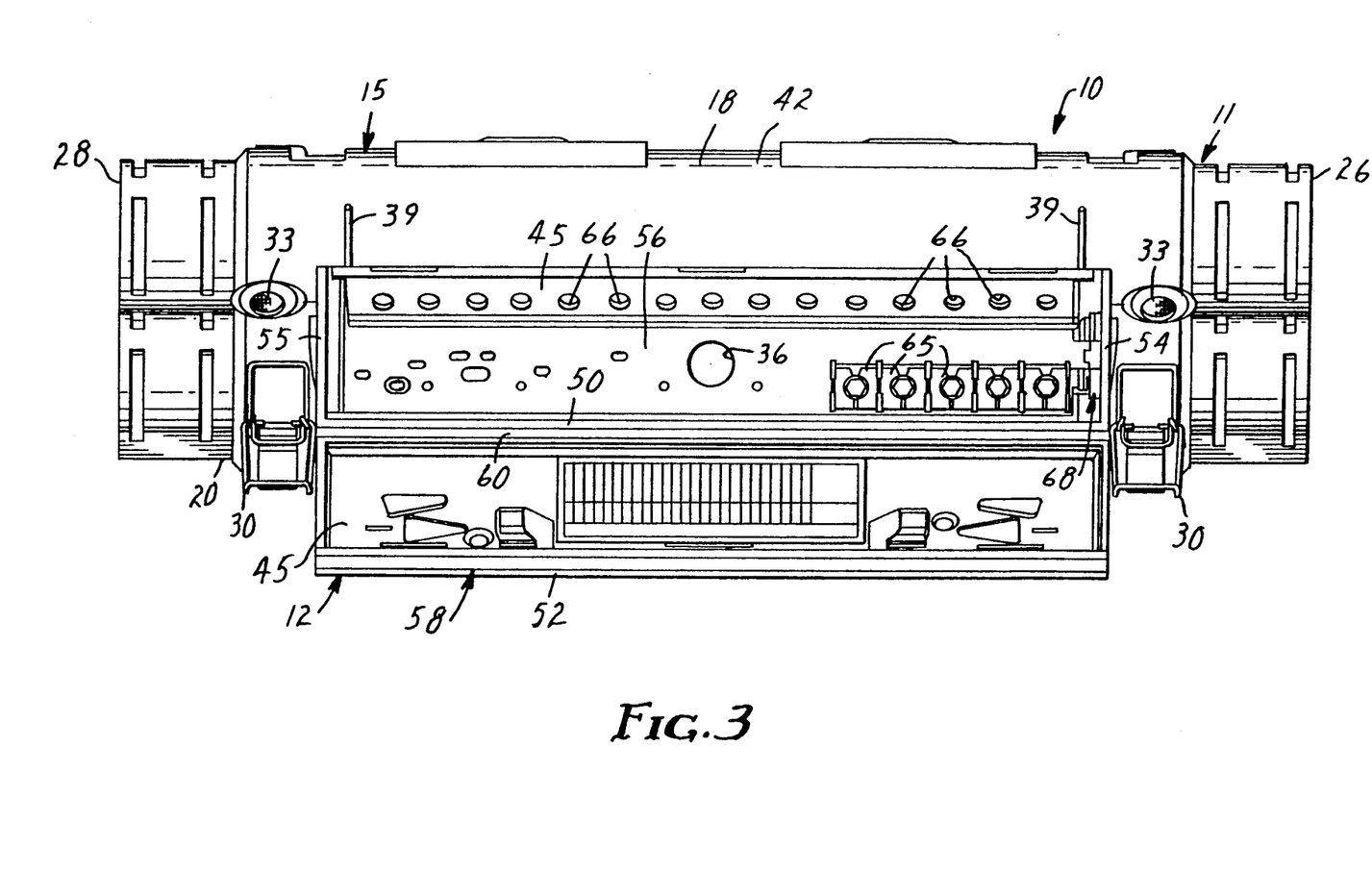
FIG. 3 is a side view of the terminal with the lid of the terminal block housing opened.

In side the housing 12, see FIG. 3, on the back wall 56, is mounted a plurality of terminal blocks 65 or connectors for joining the drop wires to the cable pairs, which terminal blocks correspond to the connectors described in U.S. Pat. No. 4,449,777, assigned to the assignee of the present application. However, other drop wire connectors can be used. From each of these connectors 65 extend the pair of wires to be tap spliced to wire pairs of the cable within the casing 15. To each of these connectors is connected a pair of drop wires, not shown, which are fed through the brackets 39 and into the housing 12 through an opening 66 in the bottom wall 52.

In at least one end wall of the terminal block housing 12, as illustrated in FIG. 4, is a wire slitter assembly 68. The slitter assembly 68 comprises a slitting knife of metal, about which is molded a housing 69. The housing 69 is formed to be readily positioned in the molded-in retaining grooves 70 and 71, see FIG. 5, which are formed in the end wall 54. The grooves 70 and 71, together with bosses in the entrance of the grooves, permit the slitter assembly to be readily snapped into place when making up a terminal according to the present invention. The housing 69 and the interior wall 45 of end wall 54, form channels therebetween of different sizes to accommodate slitting drop wire cables of different sizes. The upper channel 74 will receive the smaller cables and when forced into the channel the slitting knife will separate the cable into discrete wires to be readily placed in the terminal block. The lower channel 75 will accommodate the larger size cable.

The lid 58 is provided with molded-in detents and recesses on the inner wall 45, see FIG. 3, to support a test probe or other test equipment, a chart on which to record the line identification o the lines in the respective terminal blocks 65, only a few of which are illustrated, or labels with installation instructions.

The present invention provides a novel terminal. The terminal is light in weight, weighing only 2.8 kilograms, as compared to 4.5 kilograms of a commercial terminal according to U.S. Pat. No. 4,694,118, with the terminals comparably equipped with terminal blocks. Yet, the terminal is strong and affords many advantages to the technicians working on the closure or the terminal blocks 65. The lid 58 is readily raised and retained in place because the wall 42 forming the recess 38 is sufficiently flexible to receive the detent 61. The drop wires are readily slit and adapted to be placed in the connectors 65 after being threaded through the openings 66. The casing 15 is readily opened to allow ease of access to make the tap splices to the wires of the cable from the side of the closure 11.

It is to be understood that while a preferred embodiment of the present invention has been illustrated and described, the invention is not to be limited to the specific forms or arrangements of parts herein described and shown.

What is claimed is:

1. A terminal for telecommunication cables comprising:

a splicing closure comprising a generally cylindrical casing having a first and a second casing half joined along a longitudinal hinge line and having a longitudinal mating opening seam, said casing halves each have a sidewall section of double-wall construction defining an inner-wall portion and an outer-wall portion, with at least one cavity therebetween and first and second end walls extending between said inner-wall portion and said outer-wall portion to close each cavity, one of said casing halves having attachment means for hanger means to permit the closure to be suspended from a support cable and the other casing half having the inner-wall portion and the outer-wall portion congruent to define a support area, and a terminal block housing formed with a bottom wall, a top wall, opposite end walls and a lid, each of which are formed with an outer-wall portion and to an inner-wall portion with at least one closed cavity therebetween, and having a back wall, said back wall having a portion formed to correspond to said support area at which said terminal block housing and said second casing half are joined, said terminal block housing having an array of connectors supported on said back wall for connection to wires extending to the casing and distribution cables.

2. A terminal according to claim 1 wherein said casing halves are formed integrally and said hinge means is formed at thin wall sections of said casing halves, and said lid is formed integrally with said top wall of said terminal block housing.

3. A terminal according to claim 2 wherein said second casing half and said lid, outer wall portions, are formed with a recess and a detent for releasibly retaining said lid in an open position.

4. A terminal according to claim 1 wherein the second casing half has said support area formed thereon adjacent to the opening seam to dispose said block wall of said housing in a vertical orientation when said casing is suspended by said hanger means.

5. A terminal according to claim 4 wherein said casing halves are joined by an integral hinge and said lid of said housing and said top wall of said housing are joined by an integral hinge.

6. A terminal according to claim 1 wherein at least one said end wall of said terminal block housing is formed with molded recesses in the inner wall to receive a cable slitting assembly for separating the wires of a cable.

7. A terminal according to claim 1 wherein said bottom wall of said terminal block housing is formed with a plurality of openings to permit passage of a cable out of said terminal block housing through said bottom wall.

* * * * *

UNITED STATES PATENT AND TRADEMARK OFFICE
CERTIFICATE OF CORRECTION

PATENT NO. : 5,247,135
DATED : September 21, 1993
INVENTOR(S) : Kenneth D. Rebers, Dean C. Krenz, Sergio A. Alarcon It is certified that error appears in the above-indentified patent and that said Letters Patent is hereby corrected as shown below:

Column 7, Line 28, "and distribution" should read -- and to distribution --.

Column 8, Line 12, "said block wall" should read -- said back wall --.

Signed and Sealed this

Seventeenth Day of January, 1995

Attest:

BRUCE LEHMAN

Attesting Officer

Commissioner of Patents and Trademarks